United States Patent
Nagasaki et al.

(10) Patent No.: US 8,325,503 B2
(45) Date of Patent: Dec. 4, 2012

(54) HIGH VOLTAGE POWER SUPPLY

(75) Inventors: Osamu Nagasaki, Numazu (JP);
Masamichi Iida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/331,986

(22) Filed: Dec. 20, 2011

(65) Prior Publication Data

US 2012/0087162 A1    Apr. 12, 2012

Related U.S. Application Data

(63) Continuation of application No. 12/972,165, filed on Dec. 17, 2010, now Pat. No. 8,102,685, which is a continuation of application No. PCT/JP2009/071706, filed on Dec. 26, 2009.

(51) Int. Cl.
*H02M 3/18*    (2006.01)
*G05F 1/10*    (2006.01)

(52) U.S. Cl. .......................... 363/59; 323/222

(58) Field of Classification Search .......... 323/222–225, 323/268, 271, 282, 285, 288; 363/59, 60
See application file for complete search history.

(56) References Cited

U.S. PATENT DOCUMENTS

| | | | |
|---|---|---|---|
| 7,477,529 B2 * | 1/2009 | Salama et al. | 363/26 |
| 7,663,960 B2 * | 2/2010 | Suzuki et al. | 365/226 |

FOREIGN PATENT DOCUMENTS

| | | | |
|---|---|---|---|
| JP | 2065659 | * | 3/1990 |
| JP | 2004048952 | * | 2/2004 |

* cited by examiner

*Primary Examiner* — Matthew Nguyen
(74) *Attorney, Agent, or Firm* — Canon USA, Inc., IP Division

(57) ABSTRACT

A high voltage power supply includes a frequency signal generation unit, a voltage generation unit, and a voltage amplifying unit. The frequency signal generation unit generates a frequency signal. The voltage generation unit generates an input voltage according to the frequency signal generated by the frequency signal generation unit. The voltage amplifying unit amplifies and outputs the input voltage by rectifying and smoothing the input voltage a plurality of times. A voltage output by the voltage amplifying unit is changed by changing a frequency of the frequency signal.

13 Claims, 16 Drawing Sheets

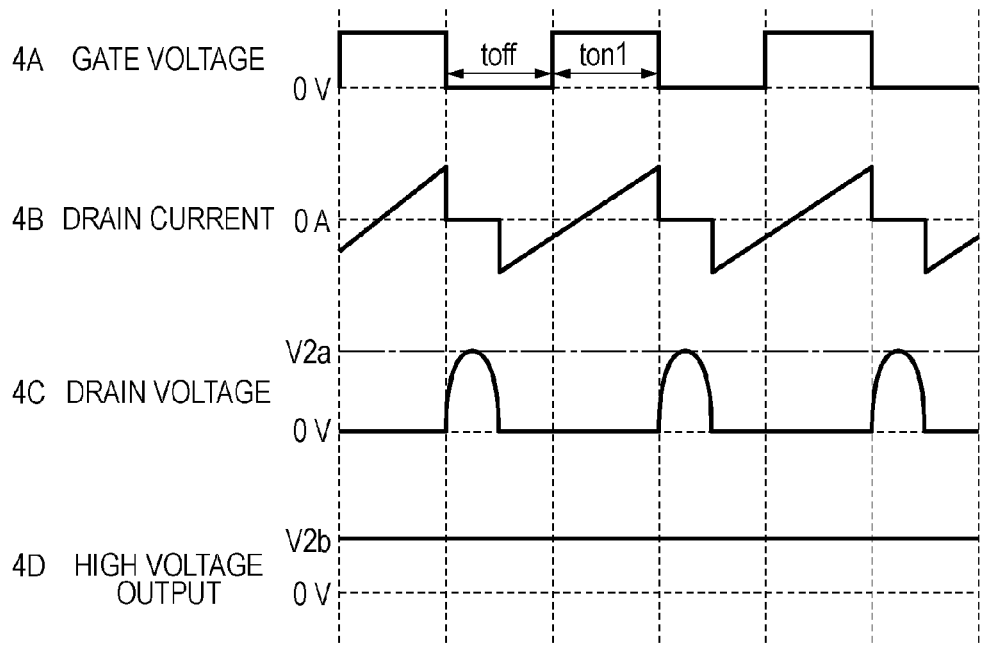
FIG. 4A — WHEN LOW VOLTAGE IS OUTPUT
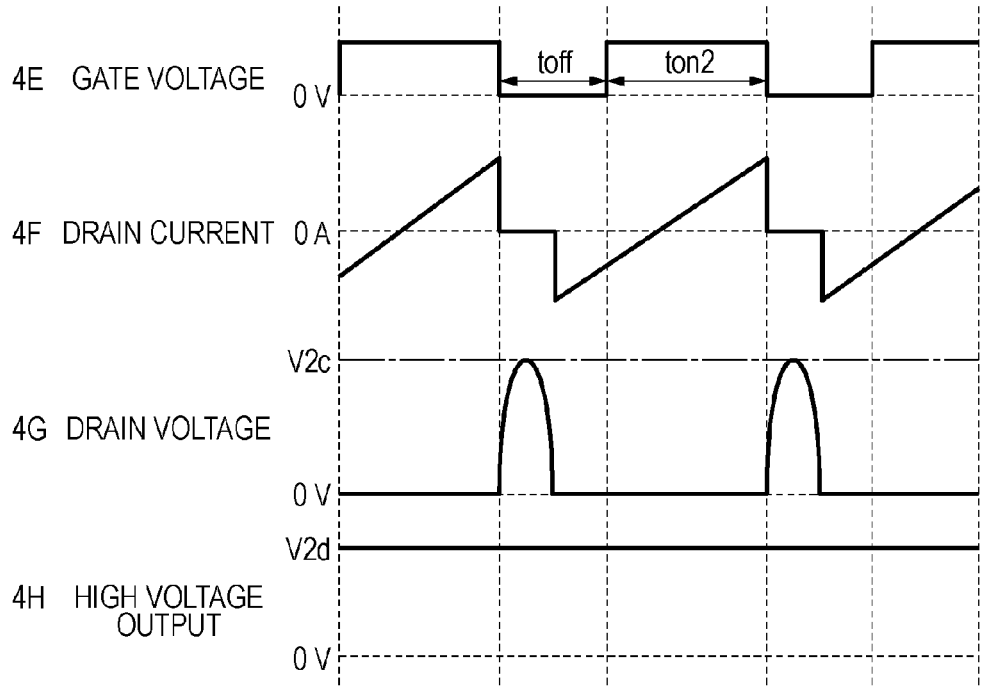
FIG. 4B — WHEN HIGH VOLTAGE IS OUTPUT

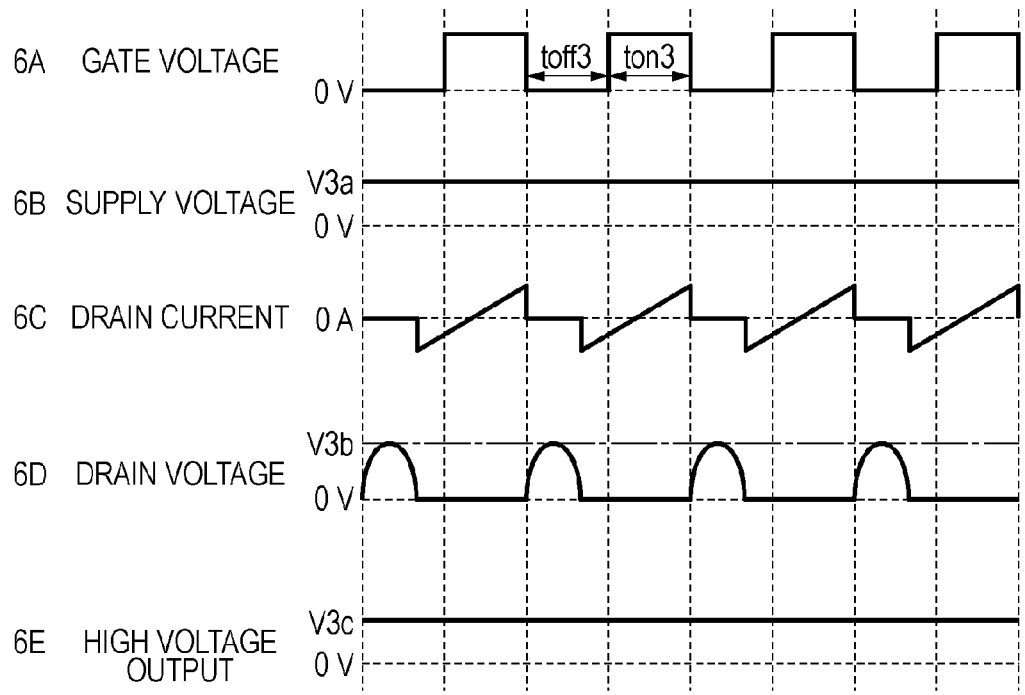
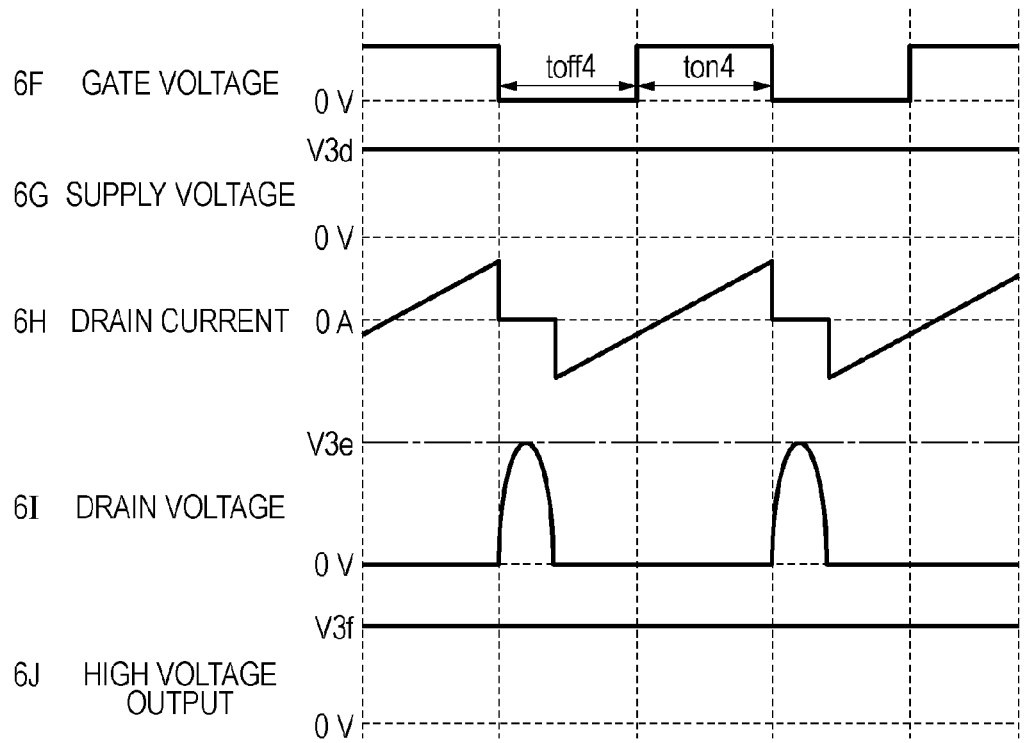

HIGH VOLTAGE POWER SUPPLY

CROSS REFERENCE TO RELATED APPLICATIONS

The present application is a continuation of U.S. patent application Ser. No. 12/972,165, filed on Jun. 30, 2011, which is a Continuation of International Application No. PCT/JP2009/071706, filed Dec. 26, 2009, all of which are hereby incorporated by reference herein in their entirety.

TECHNICAL FIELD

The present invention relates to a high voltage power supply that generates a high voltage.

BACKGROUND ART

As a conventional image formation apparatus, for example, an electrophotographic image formation apparatus includes a charging roller for charging the surface of a photoconductor drum serving as an image bearing member and a developer roller for developing an electrostatic latent image, which is formed on the photoconductor drum, by using toner serving as a developer. For example, a high voltage of about a few hundred V to a few KV (a direct-current high voltage) needs to be applied to this charging roller and this developer roller in order to charge the photoconductor drum and perform development. For generation of such a high voltage, a power supply for high-voltage generation using a wire-wound electromagnetic transformer (hereinafter referred to as a high voltage power supply) is employed.

For example, the structure of a high voltage power supply using an electromagnetic transformer is described in PTL 1, and a desired high voltage can be output to a load.

In contrast to the high voltage power supply using such an electromagnetic transformer, a power supply circuit that makes it possible to reduce the size and weight of a high voltage power supply circuit without using an electromagnetic transformer has been proposed (see PTL 2). PTL 2 discloses the structure for outputting a voltage that an LC resonant circuit obtains by amplifying a voltage (24 V) from a low voltage power supply by using a clock signal serving as a control signal to a boosting circuit including a plurality of diodes and capacitors. With this structure, no transformer is used. Thus, a high voltage power supply can be smaller and lighter.

However, the high voltage power supply described in PTL 2 has the following problems. In the high voltage power supply in PTL 2, the value of a high voltage to be output to a load is a preset fixed value and a signal having a fixed frequency is used as a control signal input to an LC resonant circuit for outputting a voltage. For example, a charging roller and a developer roller serving as loads in an image formation apparatus may have a load change due to environmental variation within the apparatus or wear in the used charging roller and developer roller. If the image formation apparatus does not adjust the voltage output to the charging roller and developer roller in accordance with such a load change, a faulty image may be created in which, for example, the degree of darkness changes. For example, if the high voltage power supply circuit in cited document 2 is applied, it is difficult to perform adjustment in accordance with a load change. Thus, an excessive voltage or an insufficient voltage may be applied to the loads.

The present invention has been made in light of the above-described points, and an object of the present invention is to provide a high voltage power supply that can appropriately adjust an output voltage in accordance with a load change.

Citation List
Patent Literature
PTL 1: Japanese Patent Laid-Open No. 4-352181
PTL 2: Japanese Patent Laid-Open No. 2003-189595

SUMMARY OF INVENTION

A power supply according to the present invention for achieving the above-describe object is characterized by including a switching unit that is driven in accordance with a frequency signal; a voltage resonant unit that is connected to the switching unit and includes an inductor, to which a voltage is applied when the switching unit is driven, and a capacitor; a connection part that connects the switching unit and the inductor; a rectifier unit that includes a diode that is connected to a power-supply voltage side of the inductor via a capacitor; a voltage amplifying unit that includes a plurality of the rectifier units; a voltage output unit that outputs a voltage obtained form the voltage amplifying unit; and a frequency control unit that controls a frequency of the frequency signal in accordance with a control signal used to set a voltage output from the voltage output unit and an output signal output from the voltage output unit.

Further features of the present invention will become apparent from the following description of exemplary embodiments with reference to the attached drawings.

BRIEF DESCRIPTION OF DRAWINGS

FIGS. 4A and 4B include diagrams of operation waveforms of a power supply according to Embodiment 2.

FIGS. 6A and 6B include diagrams of operation waveforms of the circuit illustrated in FIG. 5.

DESCRIPTION OF EMBODIMENTS

Next, the specific structure of the present invention for solving the above-described problems will be described in accordance with embodiments below. Note that the following embodiments are but exemplifications, and do not imply that the technical scope of the present invention is restricted only thereto.

Embodiment 1

Figure 1:
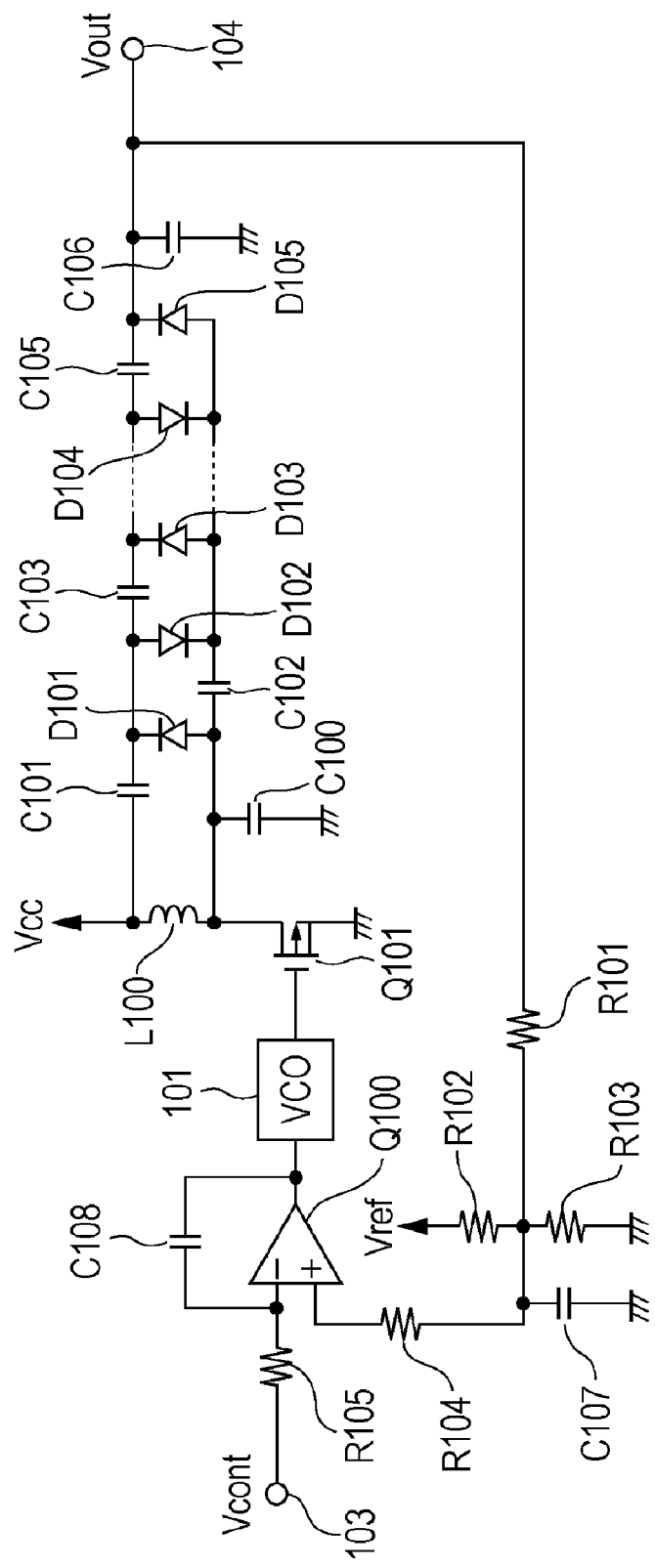
FIG. 1 is a circuit diagram of a power supply according to Embodiment 1.

FIG. 1 is a diagram illustrating the structure of a power supply circuit of a power supply for generating a high voltage (hereinafter referred to as a high voltage power supply) according to Embodiment 1. In the power supply circuit illustrated in FIG. 1, an inductor L100 and a capacitor C100 constitute a voltage resonant circuit. The inductor L100 is an element that is connected to a switching element and a power supply voltage Vcc (+24 V in this embodiment), and is an exemplary element having an inductance component to which a voltage is intermittently applied in accordance with turning on/off of the switching element. The capacitor C100 is grounded. An output from the voltage resonant circuit, which is constituted by this inductor L100 and this capacitor C100 and serves as a voltage resonant unit, is rectified and smoothed into a positive voltage by a rectifying-and-smoothing circuit. In the rectifying-and-smoothing circuit, a positive-polarity flyback voltage is extracted by a diode D101, which allows a current to pass through in a forward direction, and a capacitor C101 carrying electric charge, the capacitor C101 being connected to the cathode terminal of the diode D101 and the power supply voltage Vcc. The connection relationship between the inductor L100 and the diode D101 and capacitor C101 is as follows: the anode terminal of the diode D101 is connected to a connection unit where the inductor L100 and the capacitor C100 are connected; the cathode terminal of the diode D101 is connected to the other terminal (at the power-supply voltage side) of the inductor L100. Furthermore, a multi-stage rectifier circuit is formed by diodes D102, D103, D104, and D105 and capacitors C102, C103, C104, and C105. An output of the multi-stage rectifier circuit is grounded via a smoothing capacitor C106, and the waveform of an output voltage is smoothed. An output voltage of this multi-stage rectifier circuit is output from an output terminal 104 (Vout) serving as a voltage output unit.

Moreover, an output voltage (Vout) is input to a non-inverting input terminal (+ terminal) of an operational amplifier Q100 via a voltage detection resistor R101, voltage divider resistors R102 and R103, a protective resistor R104, and a noise eliminating capacitor C107. This circuit is an output-voltage detection circuit. An analog signal (a control signal for controlling an output voltage of the high voltage power supply) input to an input terminal 103 (Vcont) from a controller (not shown) is input to an inverting input terminal (− terminal) of the operational amplifier Q100 via a resistor R105. The operational amplifier Q100, the resistor R105, and a capacitor C108 function as an integrator circuit. That is, the control signal Vcont, which has been smoothed in accordance with an integration time constant set in accordance with the number of parts of the resistor R105 and capacitor C108, is input to the operational amplifier Q100. In this circuit, a feedback voltage input to the non-inverting input terminal (+ terminal) of the operational amplifier Q100 from the output-voltage detection circuit is adjusted to be equal to an analog voltage input to the inverting input terminal (− terminal) from the controller.

An output terminal of the operational amplifier Q100 is connected to a voltage controlled oscillator (VCO) 101 serving as a frequency control unit that controls a drive frequency of a field-effect transistor Q101, which serves as a switching unit (the switching element). This voltage controlled oscillator 101 is an exemplary oscillator that changes and sets a frequency of a frequency signal (hereinafter referred to as an output signal) used to control the drive frequency of the field-effect transistor Q101, in accordance with the input control signal (Vcont) and the output voltage (Vout), which is detected and fed back. Furthermore, an output signal serving as a frequency signal from the voltage controlled oscillator 101 is input to the gate terminal of the field-effect transistor Q101. The field-effect transistor Q101 is an exemplary switching element driven by a pulsed output signal output from the voltage controlled oscillator 101. The drain terminal of the field-effect transistor Q101 is connected to the voltage resonant circuit constituted by the above-described L100 and C100. The drain terminal of the field-effect transistor Q101 is connected to the power supply voltage Vcc via the inductor L100 and is grounded via the capacitor C100. Here, the source terminal of the field-effect transistor Q101 is grounded.

In this way, a voltage amplified by the voltage resonant circuit serving as the voltage resonant unit, the voltage resonant circuit being constituted by the inductor L100 and the capacitor C100, is directly rectified by a rectifier circuit serving as a rectifier unit. An output is increased to be a high voltage by using a multi-stage rectifier circuit (a plurality of rectifier circuits are connected to one another). Then, an output voltage can be adjusted to be appropriate for a load condition by controlling the frequency of the output signal at the voltage controlled oscillator (VCO) in accordance with the control signal and the output voltage.

Figure 2:
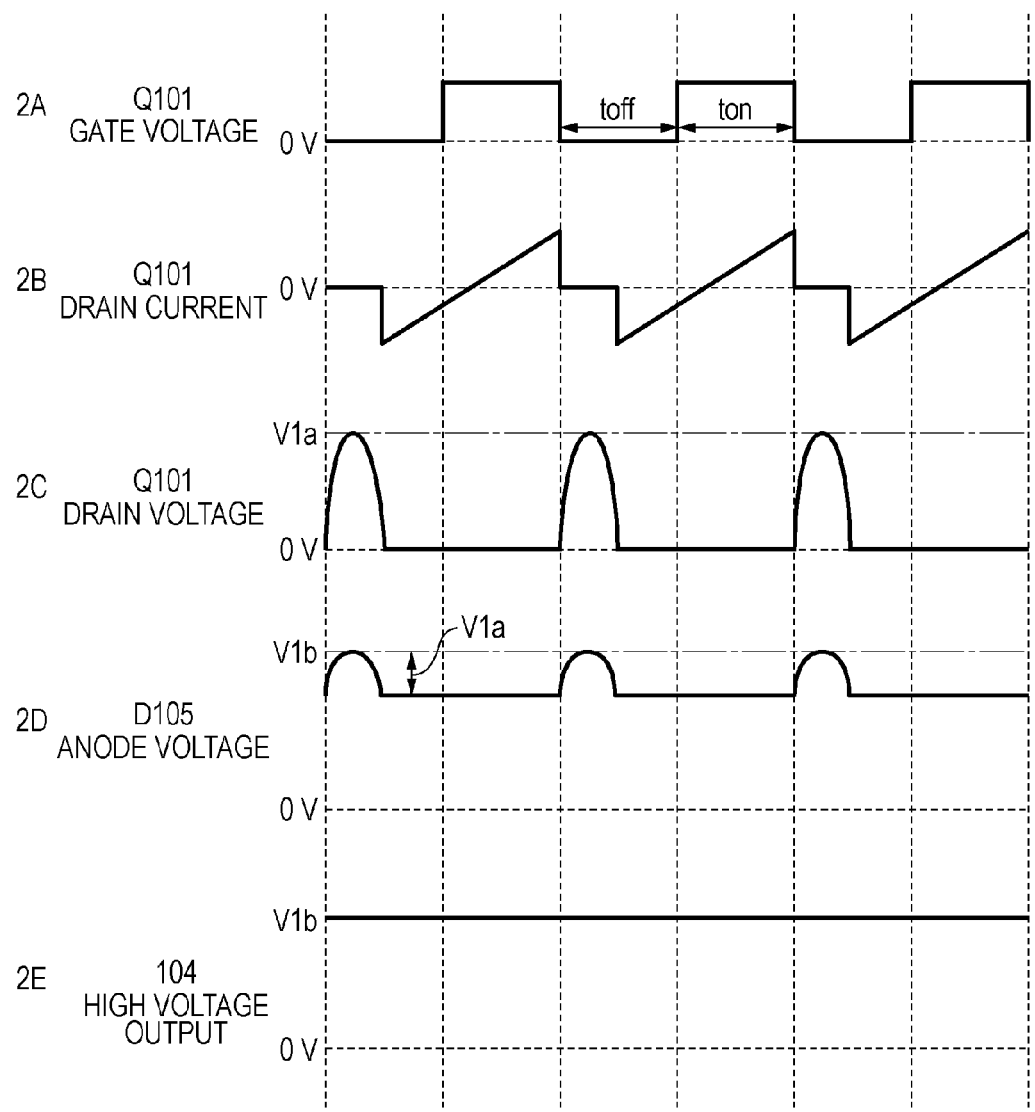
FIG. 2 is a diagram of operation waveforms of the circuit illustrated in FIG. 1.

Next, FIG. 2 illustrates operation waveforms of various units when the power supply circuit illustrated in FIG. 1 is operated. Here, 2A denotes the waveform of a voltage, which is a rectangular wave signal, applied to the gate of the field-effect transistor Q101 from the voltage controlled oscillator 101. When the field-effect transistor Q101 is turned on, a current flows from the power supply voltage Vcc to the inductor L100. The waveform of the drain current flowing through the field-effect transistor Q101 at this moment is denoted by 2B. That is, energy is accumulated in the inductor L100 in accordance with the length of time during which the current flows. Next, when the field-effect transistor Q101 is turned off, voltage resonance occurs between the capacitor C100 and the inductor L100. The waveform of the drain voltage of the field-effect transistor Q101 at this moment is denoted by 2C. The voltage represented by this voltage waveform is generally called a flyback voltage. A maximum value Via of the flyback voltage of the resonant circuit becomes a voltage value a few times that of the power supply voltage Vcc by the voltage resonance. Moreover, a voltage can be effectively applied to downstream circuits without performing what is called hardware switching by setting an OFF time in such a manner that the next ON time of the field-effect transistor Q101 starts when this resonant voltage becomes 0 V or less. The voltage generated by this resonant circuit is increased by an amount corresponding to the number of stages of the downstream stages of the multi-stage rectifier circuit. A voltage waveform at the anode terminal of the diode D105 arranged at the last stage of the rectifier circuit is denoted by 2D. This voltage waveform has a maximum voltage value $V1b$ and has a voltage value on which the flyback voltage $V1a$ is superimposed. Moreover, the voltage at the cathode terminal of the diode D105 is a constant voltage $V1b$, and a voltage obtained by smoothing and stabilizing the voltage at the cathode terminal of the diode D105 by using the smoothing capacitor C106 has a voltage waveform denoted by 2E at the output terminal 104 (Vout).

Next, an operation of the rectifying-and-smoothing circuit will be specifically described. When the field-effect transistor Q101 is turned off, the positive-polarity flyback voltage generated by the resonant circuit including the inductor L100 and the capacitor C100 is used to electrically charge the capacitor C101 via the diode D101. As a result, a maximum voltage Vmax1 is held. The diode D101 and capacitor C101 function as the first stage of the rectifier circuit. Here, there is an effect that the peak voltage waveform of the first stage can be stabilized by connecting the capacitor C101 to the cathode terminal of the first-stage diode and the power supply voltage. Next, when the field-effect transistor Q101 is turned on, a counter electromotive voltage is generated by the inductor L100. At this time, electric charge moves to the capacitor C102 via the diode D102 and the capacitor C102 is electrically charged. As a result, the flyback voltage Vmax1 is applied to the capacitor C102 as the basis for the maximum voltage Vmax1 at the capacitor C101 and the maximum voltage Vmax1 is amplified to a maximum voltage Vmax2 ($\approx$Vmax1$\times$2). This diode D102 and the capacitor C102 function as the second stage of the rectifier circuit. Furthermore, electric charge stored in the capacitor C102 as a result of charging moves to the capacitor C103 via the diode D103 at a time at which the field-effect transistor Q101 is turned off, and the capacitor C103 is electrically charged. As a result, a maximum voltage Vmax3 ($\approx$Vmax1$\times$3) is held at the capacitor C103. Thereafter, the voltage is similarly amplified by repeatedly adding a flyback voltage to a held voltage for the number of stages of the rectifier circuit with respect to the capacitor C104 and diode D104 and the capacitor C105 and diode D105. Here, when the voltage is amplified, loss due to the capacity of each of the capacitors and diodes is caused. Thus, the flyback voltage of the resonant circuit cannot be amplified by a factor of the number of stages of the rectifier circuit. However, a goal voltage output can be obtained by considering loss due to the capacity of each of the capacitors and diodes in advance. The voltage generated at the connection unit where the diode D105 is connected to the capacitor C105 is smoothed by the smoothing capacitor C106 and output from the output terminal 104 (Vout) as a stable voltage. Here, in Embodiment 1, control is performed in such a manner that the frequency of the output signal can be changed; however, the duty ratio (the ratio between the ON time and the OFF time) of the frequency is set to a fixed value. As described above, setting is set in such a manner that the field-effect transistor Q101 does not perform hardware switching.

Figure 12:
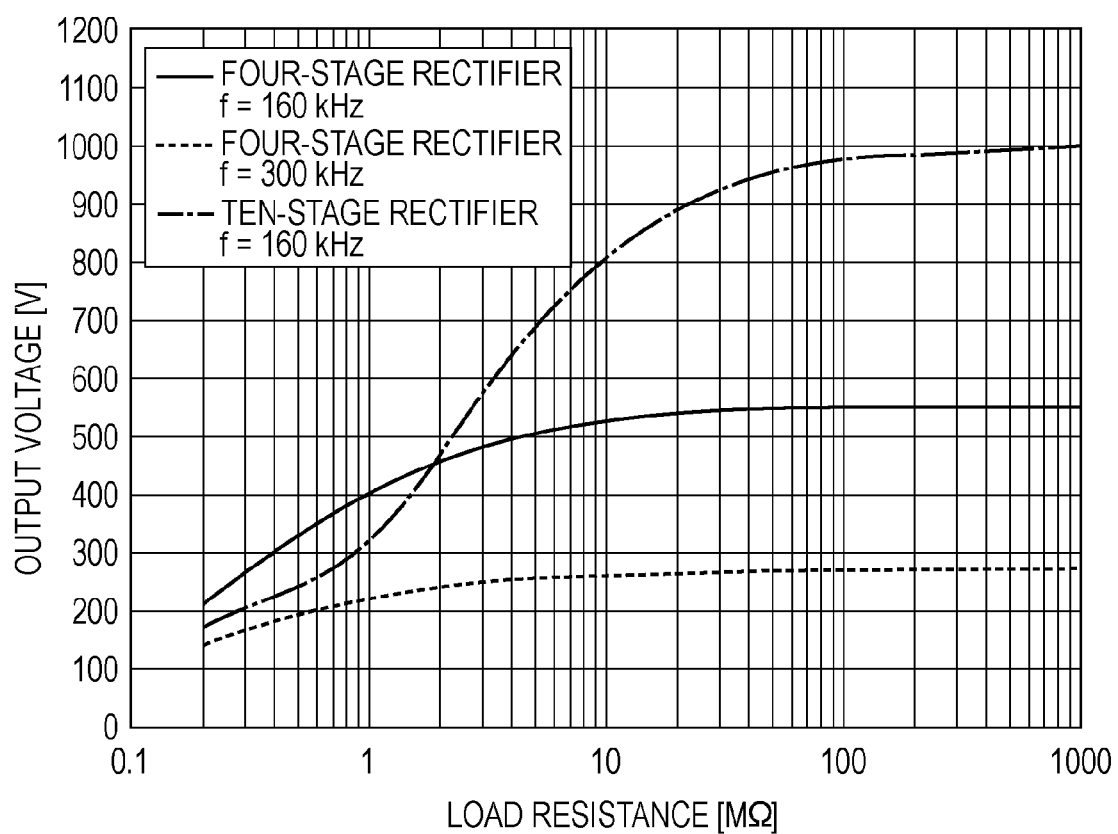
FIG. 12 is a diagram of load characteristics of the circuit according to Embodiment 1.

Here, FIG. 12 illustrates load characteristics of a typical circuit according to this embodiment. The load characteristic illustrated in FIG. 12 are characteristics in a case in which the power supply voltage is 24 V, L of the resonant circuit=220 µH, C of the resonant circuit=330 pH, and C of the rectifier circuit=330 pH. A case in which a load having a high resistance of 100 MΩ or higher is used will be described using specific numerical values. When a frequency f is 160 kHz, the peak voltage of the flyback voltage of the voltage resonant circuit is about 180 V. When the rectifier circuit has four stages, a voltage about three times higher than the peak voltage, that is, about 540 V is output. Moreover, when the rectifier circuit has ten stages, a voltage about six times higher than the peak voltage, that is, about 1080 V is output. Moreover, the output voltage can be controlled by changing the flyback voltage of the resonant circuit in accordance with an input frequency. For example, in a case in which the number of stages of the rectifier circuit is four, if the frequency f is 300 kHz, which is multiplied twofold, the output voltage decreases by approximately one half. In this way, a sufficiently high voltage can be generated with respect to the power supply voltage. Furthermore, an output voltage can be easily adjusted in accordance with the number of stages of the rectifier circuit and a control signal and an output voltage, and the output voltage can be adjusted to have an appropriate value in accordance with a load change.

Figure 3:
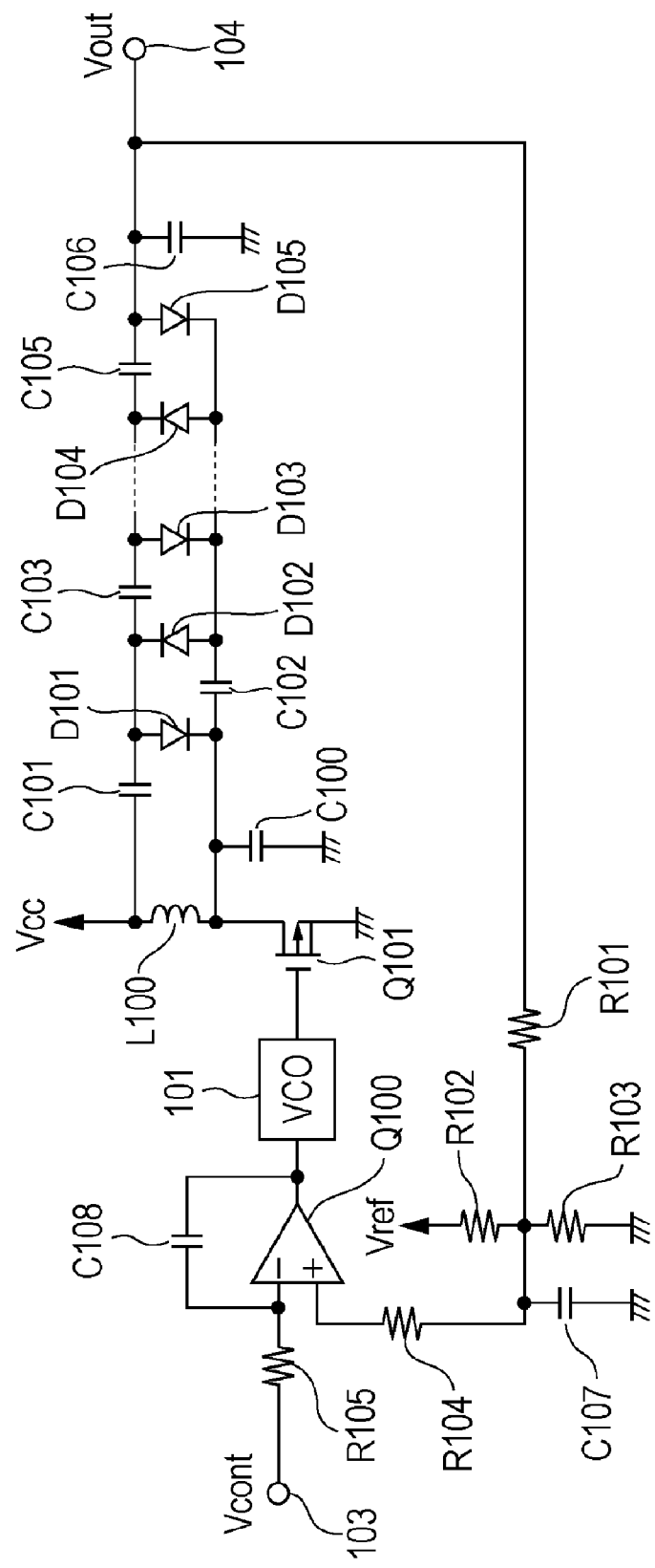
FIG. 3 is a circuit diagram of a power supply, another embodiment, according to Embodiment 1.

The above-described embodiment explains a circuit structure and a circuit operation of a high voltage power supply that can output a positive voltage, and explains voltage and current waveforms when an operation is performed. Here, a circuit structure of a high voltage power supply that can output a high negative voltage can be realized by, for example, a circuit illustrated in FIG. 3. In FIG. 3, the diodes of the rectifier circuit are connected to each other in such a manner that the polarity of the diodes is reversed compared with the circuit structure that can output a positive voltage illustrated in FIG. 1. In addition to this, the output-voltage detection circuit and the voltage controlled oscillator 101 should also have a circuit constant and specifications corresponding to the high negative voltage. Moreover, in a case in which the rectifier circuit has many stages, it is necessary to reverse the polarity of all the diodes compared with a case in which a positive voltage is output. This is clear by comparing FIG. 1 with FIG. 3 because the diodes D101, D102, D103, D104, and D105 are reversed. With the above-described structure of the power supply circuit, a stable high voltage having a negative polarity can be generated at the output terminal 104 (Vout).

Here, targets to which a high voltage is applied in the above-described electrophotographic image formation apparatus can be applied as examples of a load to which output from the high voltage power supply described in this embodiment outputs is to be supplied. For example, a charger unit (a charging roller) that charges a photoconductor drum serving as an image bearing member in a laser beam printer, a developer unit (a developer roller) that develops an electrostatic latent image formed on the photoconductor drum as a result of exposure, a transferring unit (a transferring roller) that transfers the image developed on the photoconductor drum onto a recording material, and the like can be applied as loads. Moreover, other than the image formation apparatus, a load that requires a high voltage and whose condition changes in accordance with an environment change can be applied.

As described above, according to this embodiment, an output voltage can be appropriately adjusted in accordance with a load change in a high voltage power supply that does not use a transformer.

Embodiment 2

Next, a high voltage power supply according to Embodiment 2 will be described in accordance with operation waveforms illustrated in FIGS. 4A and 4B. Here, the description about parts that are the same as circuits of the high voltage power supply according to Embodiment 1 will be omitted. The circuit according to Embodiment 2 is similar to the circuit according to Embodiment 1 illustrated in FIG. 1. However, the method for controlling an output voltage for Embodiment 2 is different from that for Embodiment 1. Embodiment 2 employs a method for controlling an output voltage in which an output voltage is controlled in such a manner that an OFF time (toff time in FIGS. 4A and 4B) of a control signal, which is input to the gate terminal of the field-effect transistor Q101, is set to a fixed value and only an ON time (ton time in FIGS. 4A and 4B) of the control signal can be changed.

FIGS. 4A and 4B illustrate operation waveforms of various units of the circuit, which are operation waveforms according to Embodiment 2, illustrated in FIG. 2, similarly to Embodiment 1. A drawing for when a low voltage is output (FIG. 4A) and a drawing for when a high voltage is output (FIG. 4B) are separate drawings. First, 4A and 4E denote the waveform of a voltage applied to the gate terminal of the field-effect transistor Q101 from the voltage controlled oscillator 101. When the field-effect transistor Q101 is turned on, a current flows from the power supply voltage Vcc to the inductor L100. The waveform of a drain current flowing through the field-effect transistor Q101 at this time is denoted by 4B and 4F. That is, in accordance with a time during which a current flows, energy is accumulated in the inductor L100. Next, when the field-effect transistor Q101 is turned off, voltage resonance occurs between the capacitor C100 and the inductor L100. The waveform of a drain voltage of the field-effect transistor Q101 at this time is denoted by 4C and 4G. The voltage having this waveform is generally called a flyback voltage. The voltage resonance makes maximum values V2a (4C) and V2c (4G) of the flyback voltage of the resonant circuit be voltage values a few times that of the power supply voltage Vcc. A voltage can be efficiently applied to the downstream-stage circuits without performing hardware switching by setting the next ON time of the field-effect transistor Q101 to start when this resonance voltage is 0 V or less. The voltage generated by this resonant circuit is increased by an amount corresponding to the number of stages of the downstream stages of the rectifier circuit. Waveforms obtained by smoothing and stabilizing a voltage waveform output from the rectifier circuit using the smoothing capacitor C106 are voltage waveforms denoted by 4D and 4H at the output terminal 104 (Vout). Voltages V2b (4D) and V2d (4H) are output.

Next, an operation performed when control is performed in such a manner that the frequency of a control signal input to the gate terminal of the field-effect transistor Q101 from the voltage controlled oscillator 101 can be changed will be described. In frequency-based output voltage control, an output voltage can be controlled in such a manner that the frequency is changed to be lower when the output voltage is desired to be higher and the frequency is changed to be higher when the output voltage is desired to be lower. More specifically, when the frequency is changed to be lower, more energy is stored in the inductor L100 as the ON time ton of the field-effect transistor Q101 becomes longer. As a result, the maximum value of the flyback voltage waveform of the resonant circuit also becomes larger. That is, the voltage output from the output terminal 104 becomes higher. In contrast, when the frequency is changed to be higher, less energy is stored in the inductor L100 as the ON time ton of the field-effect transistor Q101 becomes shorter. As a result, the maximum value of the flyback voltage waveform of the resonant circuit also becomes smaller. That is, the voltage output from the output terminal 104 becomes lower. In this way, the output voltage can be controlled by changing the frequency.

With respect to this operation, when the frequency is changed to be higher in a state in which the duty ratio of the control signal (the ratio of the ON time to the OFF time) is set to a fixed value, the ON time ton and the OFF time toff of the field-effect transistor Q101 similarly become shorter. When the ON time ton and the OFF time toff similarly become shorter and the frequency becomes higher to a certain value, the Q101 is turned on while the drain voltage of the field-effect transistor Q101 has an electric potential. That is, the field-effect transistor Q101 performs hardware switching and loss caused by the switching operation becomes greater. As described above, when hardware switching is performed while the drain voltage is high, a current flows between the drain and the source at the moment when the Q101 is turned on, resulting in greater loss.

Thus, in Embodiment 2, as illustrated in FIGS. 4A and 4B, control is performed in such a manner that the OFF time toff during which a flyback voltage is generated is set to a fixed value, the control signal is turned on after the flyback voltage decreases to 0 V or less, and only the ON time ton can be changed. Here, the OFF time toff is made to be longer than a time width of a flyback voltage waveform set in accordance with the resonance frequency of the voltage resonant circuit constituted by the inductor L100 and the capacitor C100. Moreover, the relationship between an ON time ton1 for when a low voltage is output and an ON time ton2 for when a high voltage is output is controlled to be ton1<ton2.

Here, even the method described in Embodiment 1, in which control is performed in such a manner that a frequency can be changed by setting the duty ratio of the control signal to a fixed value, can perform control in such a manner that the frequency can be changed in a frequency range that does not require hardware switching; however, Embodiment 2 is effective in a case in which the frequency range in which control is performed and the frequency can be changed is desired to be a wider range.

As described above, according to this embodiment, an output voltage can be appropriately adjusted in accordance with a load change in a high voltage power supply that does not use a transformer, and also hardware switching can be prevented from being performed, circuit loss can be reduced, and a stable high voltage can be output.

Embodiment 3

Next, Embodiment 3 will be described with reference to FIGS. 5 and 6. Note that the description about parts that are the same as circuits of the high voltage power supply according to Embodiment 1 will be omitted. The circuit of the high voltage power supply according to Embodiment 3 and the circuit according to Embodiment 1 differ in that Embodiment 3 employs a method for controlling an output voltage, in which an output voltage is changed by performing control in such a manner that a supply voltage can be changed in addition to the frequency control.

First, the structure and operation of the circuit according to this Embodiment 3 will be described with reference to FIG. 5. An analog signal (a control signal (Vin) for the high voltage power supply) input to an input terminal 105 from a controller (not shown) is input to the inverting input terminal (− terminal) of the operational amplifier Q100 via a resistor R106. The operational amplifier Q100, the resistor R106, and a capacitor C109 function as an integrator circuit. That is, the control signal Vin, which has been smoothed in accordance with an integration time constant set in accordance with the number of parts of the resistor R106 and capacitor C109, is input to the operational amplifier Q100. On the other hand, an output voltage generated at the output terminal 104 is input to the non-inverting input terminal (+ terminal) of the operational amplifier Q100 via the voltage detection resistor R101, the voltage divider resistors R102 and R103, the protect resistor 104, and the noise eliminating capacitor C107, which constitute output-voltage detection means. A feedback voltage to be input to the non-inverting input terminal (+ terminal) of the operational amplifier Q100 from the output-voltage detection means is adjusted to be equal to an analog voltage input to the inverting input terminal (−terminal) from the controller.

The output voltage of the operational amplifier Q100 makes the electric potential of the base of a transistor Q102 change via a resistor R107. Furthermore, the voltage obtained by reducing the electric potential of the base of the transistor Q102 by the electric potential between the base and the emitter of the transistor Q102 is a voltage to be applied to the inductor L100. Here, a capacitor C111 is connected to stabilize a supply voltage to be applied to the inductor L100 and a diode D106 is connected to protect the transistor Q102. The structure of the circuit serving as a voltage changing unit that changes a voltage to be applied to this inductor L100 is a feature of this Embodiment 3.

Moreover, a control frequency is input to the gate terminal of the field-effect transistor Q101 from a frequency input terminal 106 (Vclk). The duty ratio of this control frequency may be set to a fixed value or may be set as described in Embodiment 2 in such a manner that the duty ratio can be changed. In this Embodiment 3, a frequency that has been preset in such a manner that the field-effect transistor Q101 is prevented from performing hard switching is input from the controller (not shown) via the frequency input terminal 106 (Vclk) as a control signal, and control is performed in such a manner that the supply voltage to be applied to the inductor L100 can be changed so as to obtain a desired output voltage. In this Embodiment 3, a control signal (whose frequency can be changed) is input from the controller; however, control may be performed in such a manner that the control signal can be changed by using a voltage controlled oscillator (VCO) as described in Embodiment 1.

Figure 5:
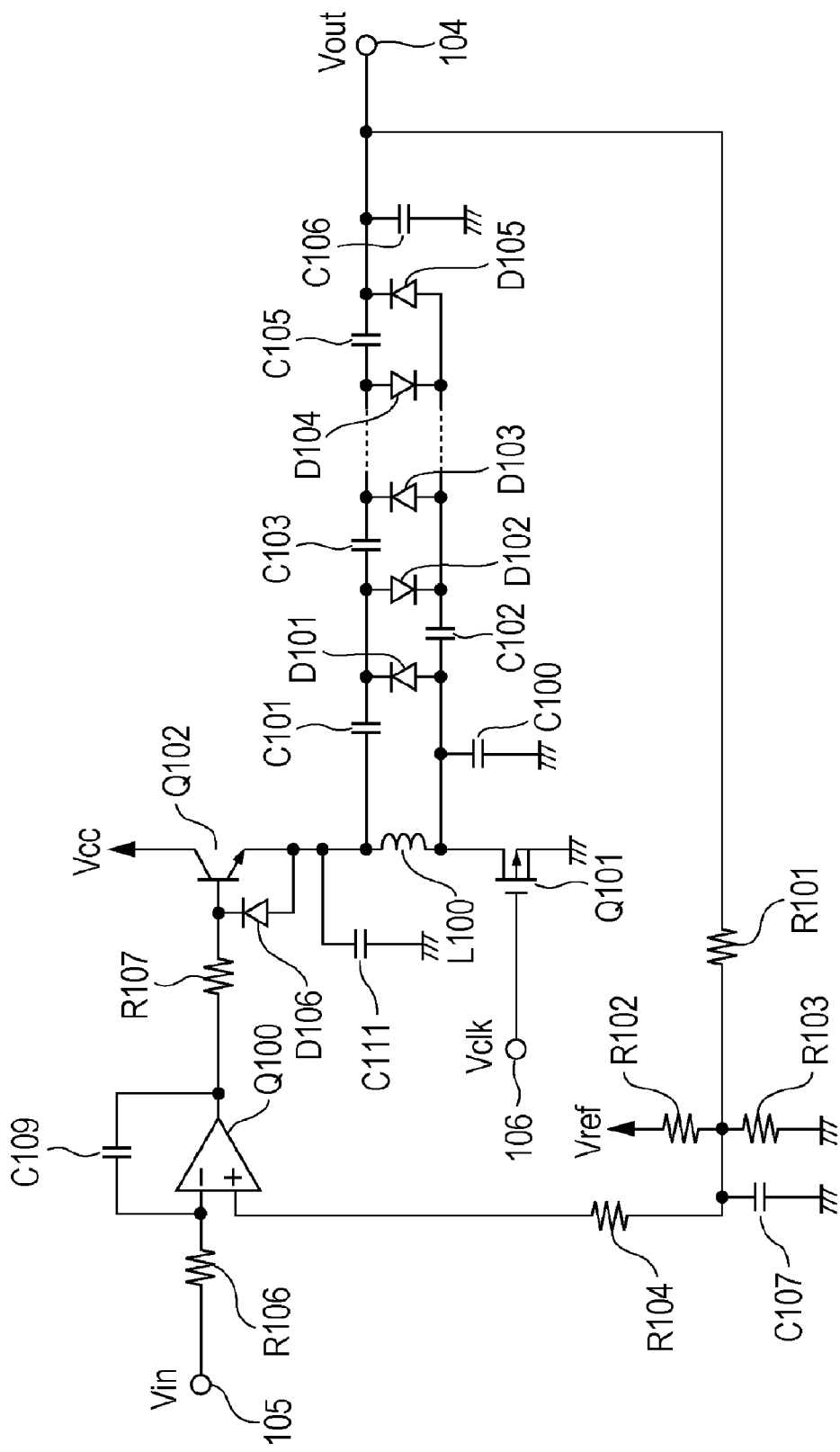
FIG. 5 is a circuit diagram of a power supply according to Embodiment 3.

FIGS. 6A and 6B illustrate operation waveforms of various units of the circuit illustrated in FIG. 5 and includes drawings: a drawing for when a low voltage is output (FIG. 6A) and a drawing for when a high voltage is output (FIG. 6B). First, 6A and 6F denote the waveform of a voltage applied to the gate of the field-effect transistor Q101 from the voltage controlled oscillator 101. The relationship between an OFF time toff3 for when a low voltage is output and an OFF time toff4 for when a high voltage is output is toff3<toff4, and the relationship between an ON time ton3 for when a low voltage is output and an ON time ton4 for when a high voltage is output is ton3<ton4. Here, similarly to Embodiment 1, the duty ratio is set to a fixed value. Moreover, 6B and 6G denote a voltage applied to the inductor L100 by supply-voltage changing means, which is a feature of Embodiment 3. The relationship between a supply voltage V3a for when a low voltage is output and a supply voltage V3d for when a high voltage is output is V3a<V3d.

Next, when the field-effect transistor Q101 is turned on, a current flows from the power supply voltage Vcc to the inductor L100. The waveform of a drain current flowing through the field-effect transistor Q101 at this time is denoted by 6C and 6H. The drain current changes in accordance with the supply voltage. Next, when the field-effect transistor Q101 is turned off, voltage resonance occurs between the capacitor C100 and the inductor L100. The waveform of a drain voltage of the field-effect transistor Q101 at this time is denoted by 6D and 6I. This drain voltage changes in accordance with the supply voltage and the drain current. Here, the above-described OFF time toff3 for when a low voltage is output is set in such a manner that the next ON of the field-effect transistor Q101 starts when the resonant voltage is 0 V or less. As a result, a voltage can be efficiently applied to the downstream-stage circuits without making hardware switching be performed.

The flyback voltage generated by the resonant circuit is increased by an amount corresponding to the number of stages of the downstream stages of the rectifier circuit. Voltage waveforms obtained by smoothing and stabilizing a voltage waveform output from the rectifier circuit using the smoothing capacitor C106 are voltage waveforms denoted by 6E and 6J at the output terminal 104 (Vout). The relationship between a supply voltage V3c for when a low voltage is output and a supply voltage V3f for when a high voltage is output is V3c<V3f.

As described above, according to this embodiment, an output voltage can be appropriately adjusted in accordance with a load change in a high voltage power supply that does not use a transformer, and also a voltage range in which control is performed can be wider by performing control in such a manner that the supply voltage can be changed and the frequency can also be changed. Here, in this Embodiment 3, although it has been described that control is performed in such a manner that the supply voltage can be changed and also the frequency can be changed, a method in which an output voltage is controlled by setting the frequency to a fixed value and performing control in such a manner that the supply voltage can be changed is also effective.

Embodiment 4

Next, Embodiment 4 of the present invention will be described with reference to FIGS. 7 and 8. Note that, the description about parts that are the same as circuits of the high voltage power supply according to Embodiment 1 will be omitted. This Embodiment 4 and the above-described Embodiment 1 differ in that, as illustrated in the circuit of FIG. 7, an inductor L101 is inserted in series between a connection unit that connects the inductor L100 and the capacitor C100, which constitute the voltage resonant circuit, and the rectifier circuit and a current resonant circuit is formed using the capacitance characteristics of the downstream-stage diodes and capacitors.

Figure 7:
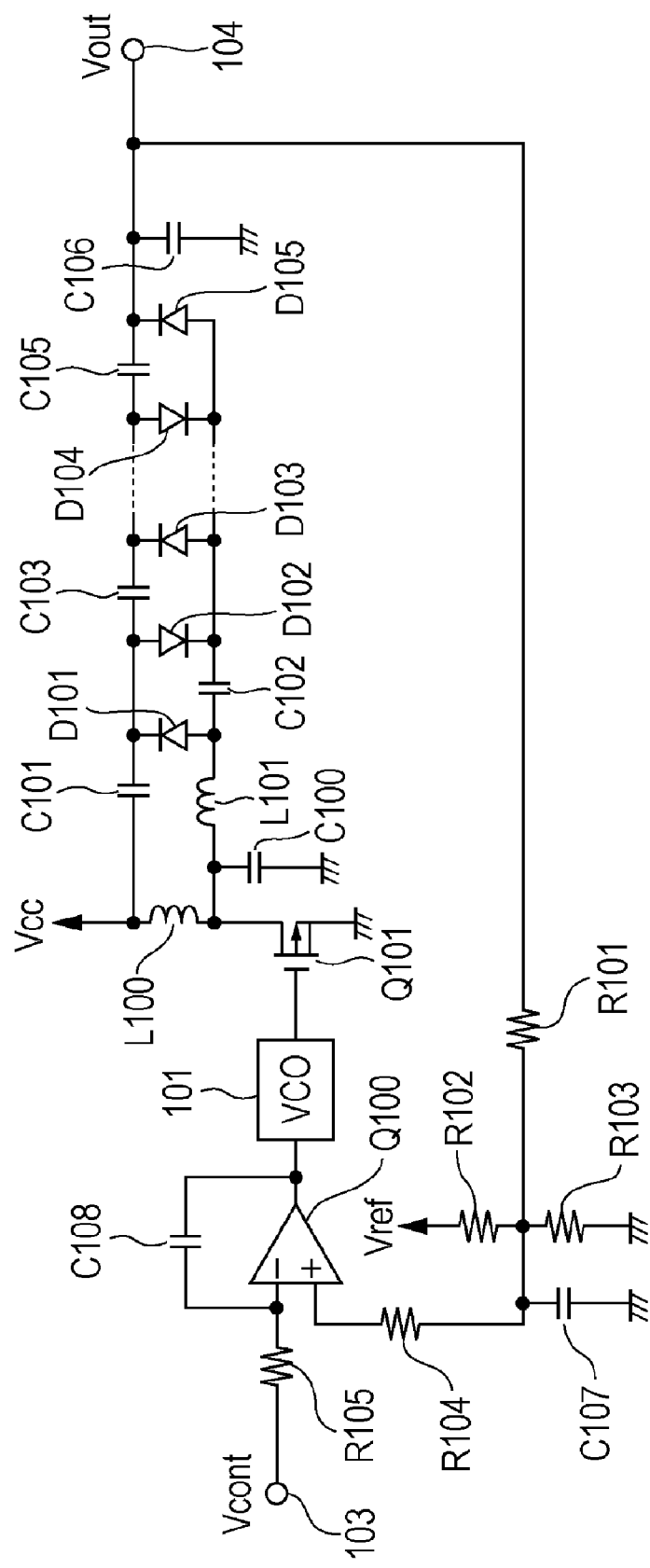
FIG. 7 is a circuit diagram of a power supply according to Embodiment 4.
Figure 8:
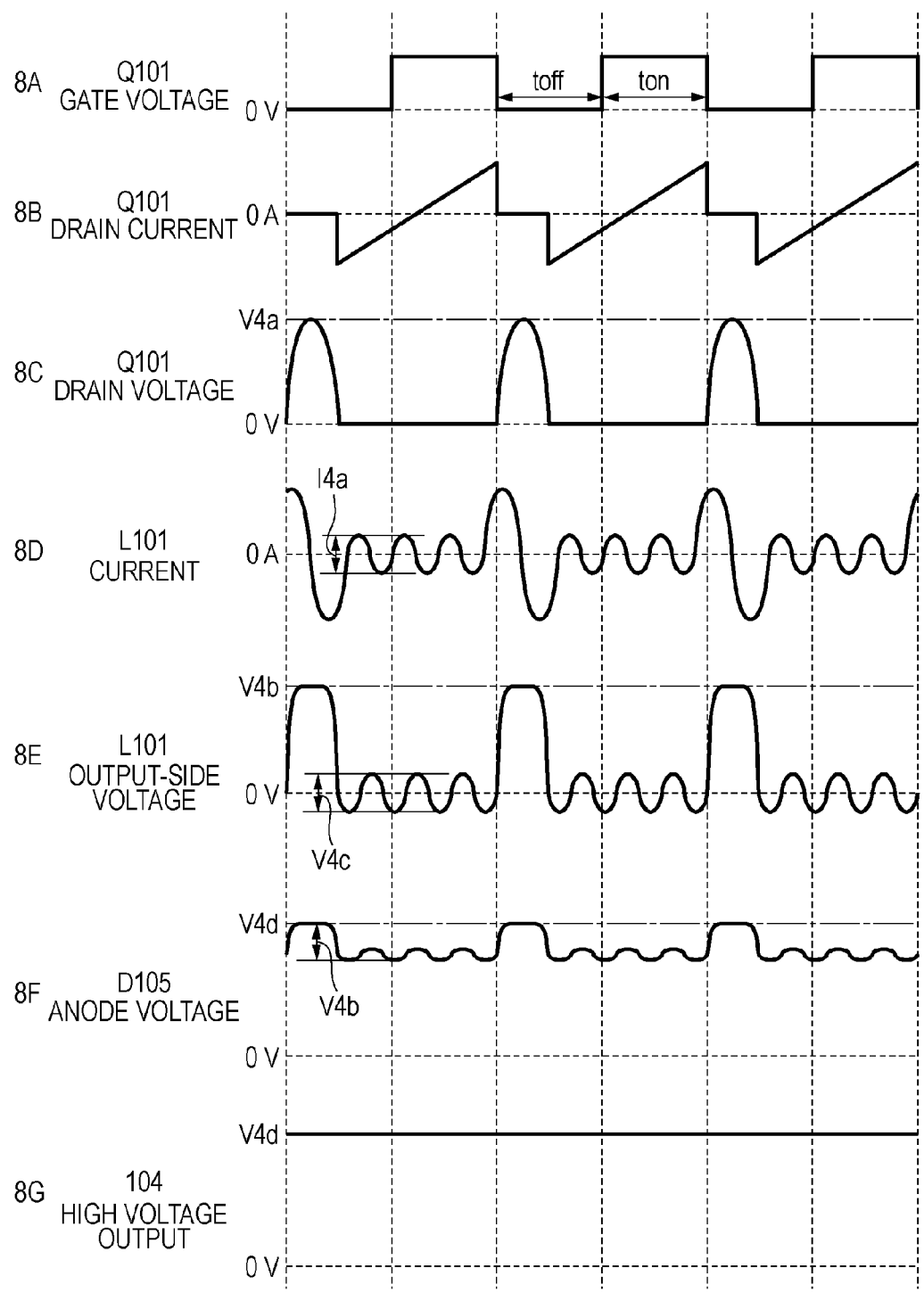
FIG. 8 is a diagram of operation waveforms of the circuit illustrated in FIG. 7.

FIG. 8 illustrates operation waveforms of various units illustrated in FIG. 7. Here, 8A denotes a voltage applied to the gate terminal of the field-effect transistor Q101. The waveform representing a drain current flowing through the field-effect transistor Q101 is denoted by 8B. The waveform of a drain voltage of the field-effect transistor Q101 is denoted by 8C. The voltage resonance makes a maximum value V4a of the flyback voltage be amplified to a voltage value a few times that of the power supply voltage Vcc. The waveform of a current flowing through the inductor L101 is denoted by 8D. Here, this current waveform changes with a constant of the circuit. A current amplitude I4a of a sine wave having a constant frequency is superimposed on the current flowing through the inductor L101. This is a frequency component set in accordance with the capacitance characteristics of the downstream stages of the rectifier circuit and the constant of the inductor L101. The capacitance characteristics of diodes are generally low, and thus the resonance frequency becomes higher. The voltage at the output side of the inductor L101 is denoted by 8E, and a maximum value V4b of the voltage is almost the same as the maximum value V4a of the above-described flyback voltage. However, the voltage waveform changes by passing through the inductor L101 and an effective value of the flyback voltage increases. Furthermore, a voltage amplitude V4c is superimposed on an area where the flyback voltage is 0 V by the amplitude of the current having a high frequency generated in part 8D. The flyback voltage is changed to have a voltage waveform (a voltage waveform is a substantial sine wave) having a higher effective value by this circuit operation. The waveform of a voltage at the anode terminal of the diode D105 arranged at the last stage of the rectifier circuit is denoted by 8F. The voltage waveform has a maximum voltage value V4d, and the above-described amplitude voltage V4b is ideally superimposed on the voltage waveform. Moreover, the voltage at the cathode terminal of the diode D105 is a constant voltage V4d. The voltage waveform, which is smoothed and stabilized by the smoothing capacitor C106, at the output terminal 104 (Vout) is denoted by 8G.

As described above, according to this embodiment, an output voltage can be appropriately adjusted in accordance with a load change in a high voltage power supply that does not use a transformer, and the effective value of the flyback voltage can be increased. Thus, a higher output power can be obtained.

Embodiment 5

Next, Embodiment 5 will be described with reference to FIGS. 9, 10, and 11. Note that, the description about parts that are the same as circuits of the high voltage power supply according to Embodiment 1 will be omitted. This Embodiment 5 and the above-described Embodiment 1 differ in that, unlike the voltage resonant circuit of Embodiment 1 in which an inductor and a capacitor are connected in parallel, a push-pull current amplifier circuit is constituted by connecting the base of an NPN transistor Q102 to the base of a PNP transistor Q103 and connecting the emitter of the NPN transistor Q102 to the emitter of the PNP transistor Q103, the NPN transistor Q102 and PNP transistor Q103 serving as switching units (switching elements). Furthermore, a capacitor C110 is inserted between the output unit of the current amplifier circuit and the rectifier circuit, and an inductor L110 and a resistor R110 are connected in series to the ground to constitute an LCR series resonance circuit. In this Embodiment 5, a circuit using the capacitor C110, the inductor L110, and the resistor R110 is illustrated as an example of the current resonant circuit.

Figure 10:
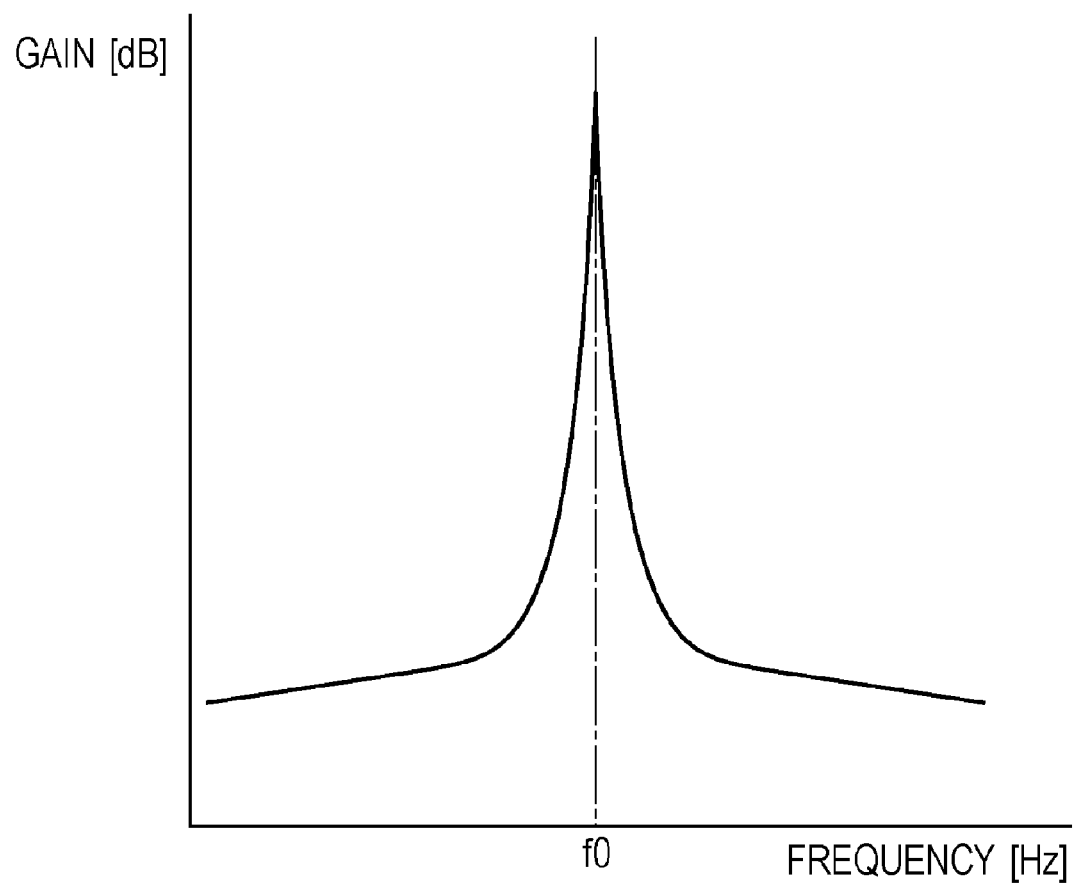
FIG. 10 illustrates frequency characteristics of the circuit illustrated in FIG. 9.

The frequency characteristics of this current resonant circuit are illustrated in FIG. 10. A gain (dB) reaches a maximum value at a resonance frequency f0, and the f0 is set in accordance with the constant of the inductor L110 and the constant of the capacitor C110. Moreover, it is clear that this circuit has a characteristic of a high Q. In order to achieve better control, it is desirable that the resistor R110 is inserted to optimize the Q of the circuit. Thus, the output performance of the circuit can be improved by setting the control frequency near the resonance frequency f0.

Figure 9:
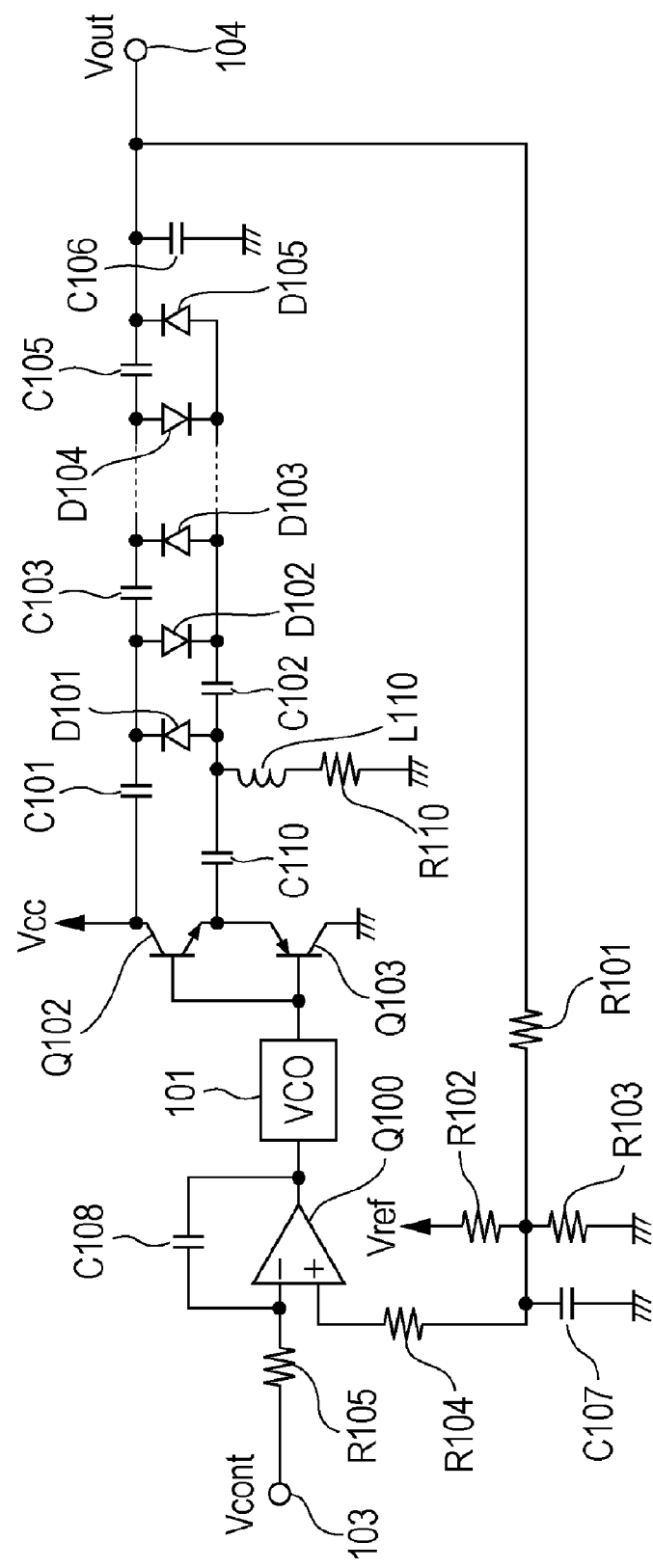
FIG. 9 is a circuit diagram of a power supply according to Embodiment 5.
Figure 11:
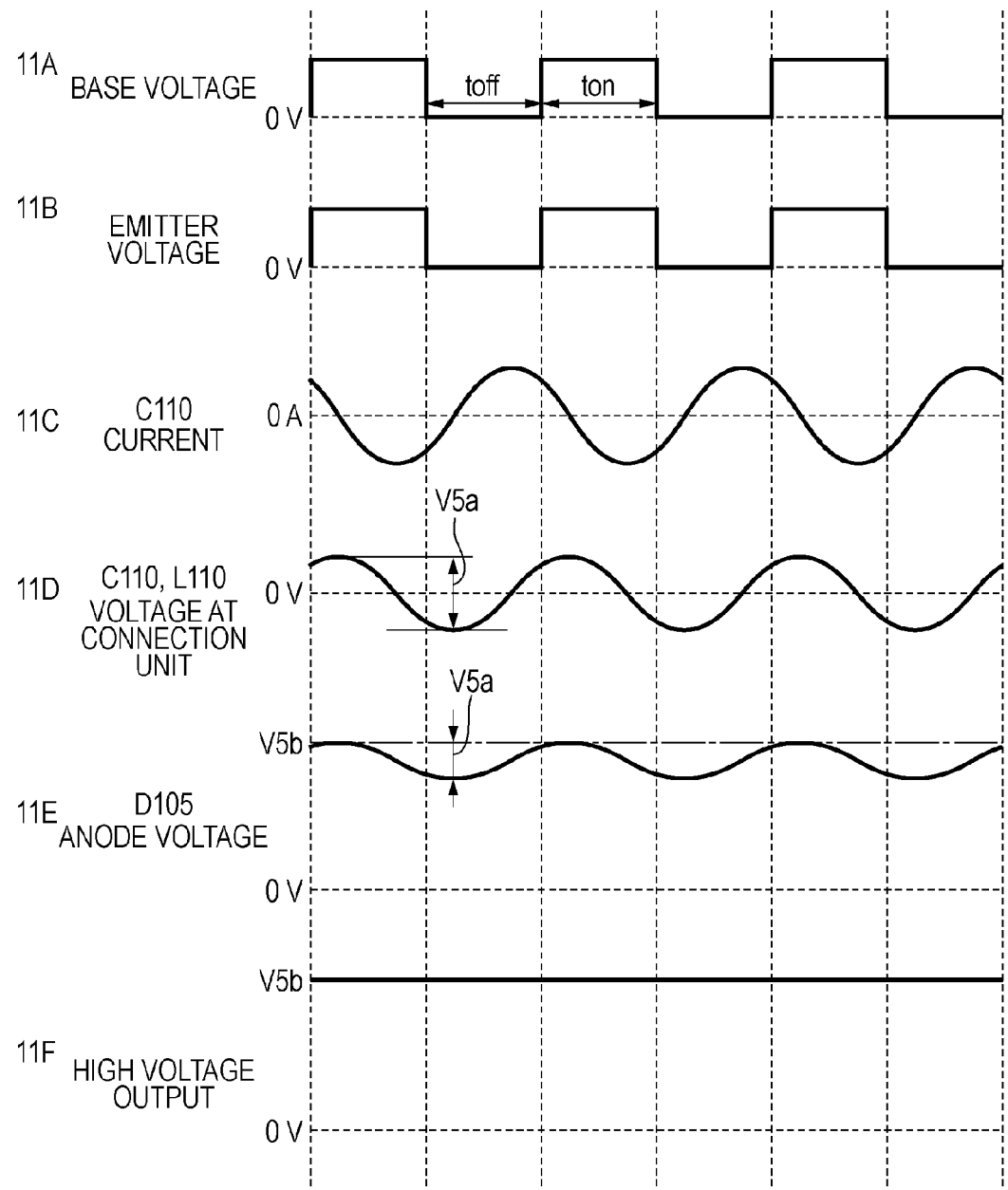
FIG. 11 is a diagram of operation waveforms of the circuit illustrated in FIG. 9.

FIG. 11 illustrates operation waveforms of various units of the circuit illustrated in FIG. 9. Here, 11A denotes a base voltage applied to the gate terminals of the NPN transistor Q102 and PNP transistor Q103, the gate terminals being connected to each other. The emitter voltage at the emitter terminals of the NPN transistor Q102 and PNP transistor Q103, the emitter terminals being connected to each other, is denoted by 11B. Since the current amplifier circuit is formed, the gate terminal and the emitter terminal have substantially the same voltage. The waveform of a current flowing through the capacitor C110 is denoted by 11C. The phase of this current waveform is 45 degrees ahead of that of the voltage waveform obtained at the gate terminal and denoted by 11A. The voltage at a connection unit that connects the capacitor C110 and the inductor L110, which constitute the current resonant circuit, is denoted by 11D, and the voltage is converted into a sine wave having an amplitude voltage V5a by the current resonant circuit. The phase of the voltage waveform is 45 degrees behind that of the voltage waveform obtained at the gate terminal and denoted by 11A and 90 degrees behind that of the current waveform of the capacitor C110 denoted by 11C. A voltage waveform at the anode terminal of the diode D105 arranged at the last stage of the resonant circuit is denoted by 11E. The voltage waveform has a maximum voltage value V5b, and the above-described amplitude voltage V5a is ideally superimposed on the voltage waveform. Moreover, the voltage at the cathode terminal of the diode D105 is a constant voltage V5b. The voltage waveform, which is smoothed and stabilized by the smoothing capacitor C106, at the output terminal 104 (Vout) is denoted by 11F.

As described above, according to this embodiment, current amplification is performed by the push-pull current resonant circuit and control is performed near the resonance frequency f0 in order to take advantage of the characteristics of the current resonant circuit, which has a high gain. Furthermore, by performing voltage amplification by the multi-stage rectifier circuit, an output voltage can be appropriately adjusted in accordance with a load change in a high voltage power supply that does not use a transformer and higher voltage power can be obtained. Moreover, the structure of the circuit according to this Embodiment 5 also has an advantage in that there is no need to use a transistor that can withstand a high voltage because current amplification is performed using the power supply voltage as is.

Embodiment 6

Next, a high voltage power supply according to this Embodiment 6 will be described with reference to FIG. 13. Note that, the description about parts that are the same as circuits of the high voltage power supply according to Embodiment 1 will be omitted. This Embodiment 6 and the above-described Embodiment 1 differ in that the circuit according to this embodiment has two channels of a first output voltage (Vout1) and a second output voltage (Vout2). Furthermore, this embodiment is characterized in that the first output voltage is obtained from the last stage of the rectifier circuit serving as a rectifier unit and the second output voltage is obtained from the upstream portion of the rectifier circuit with respect to the last stage thereof. For example, when the rectifier circuit has two stages, a voltage (Vout1) output from a first voltage output unit is an output from the second stage, which is the last stage, of the rectifier circuit serving as a second rectifier unit and a voltage (Vout2) output from a second voltage output unit is an output from the first stage of the rectifier circuit serving as a first rectifier unit.

A circuit structure and an operation will be described with reference to FIG. 13. As described in Embodiment 1, according to an ideal operation of the rectifier circuit, a DC output, which is n times the flyback voltage Vmax, can be obtained (where n is an integer). More specifically, an output which is twice the Vmax can be obtained at the cathode side of the D103 illustrated in FIG. 13. Here, if an output which is n times the Vmax is obtained at the cathode side of the D105 of the circuit illustrated in FIG. 13, that is, if a rectifier circuit has a structure in which an output Vout1 is n or Vmax×n, an output Vout2 is (n−1) times the Vmax. Thus, two arbitrary voltage outputs as expressed below can be obtained from the circuit illustrated in FIG. 13.

$$Vout1 = n \times Vmax \qquad (Eq.\ 1)$$

$$Vout2 = (n-1) \times Vmax \qquad (Eq.\ 2)$$

(n is an integer)

Moreover, the circuit structure is simple and inexpensive in which just a C112 is used as a part for outputting the Vout2. Here, a case in which there are two channels for output voltages has been described in this Embodiment 6, but the number of channels for output voltages is not limited to two. The circuit structure may have three or more channels. In this case, each of many output voltages should be obtained from a corresponding one of rectifier stages.

As described above, according to this embodiment, an output voltage can be appropriately adjusted in accordance with a load change in a high voltage power supply that does not use a transformer, and a plurality of high voltage outputs can be obtained.

Embodiment 7

Next, a high voltage power supply according to Embodiment 7 will be described with reference to FIG. 14. Note that, the description about parts that are the same as circuits of the high voltage power supply according to Embodiment 1 will be omitted. Differences between this Embodiment 7 and the above-described Embodiment 6 will be described below.

Figure 13:
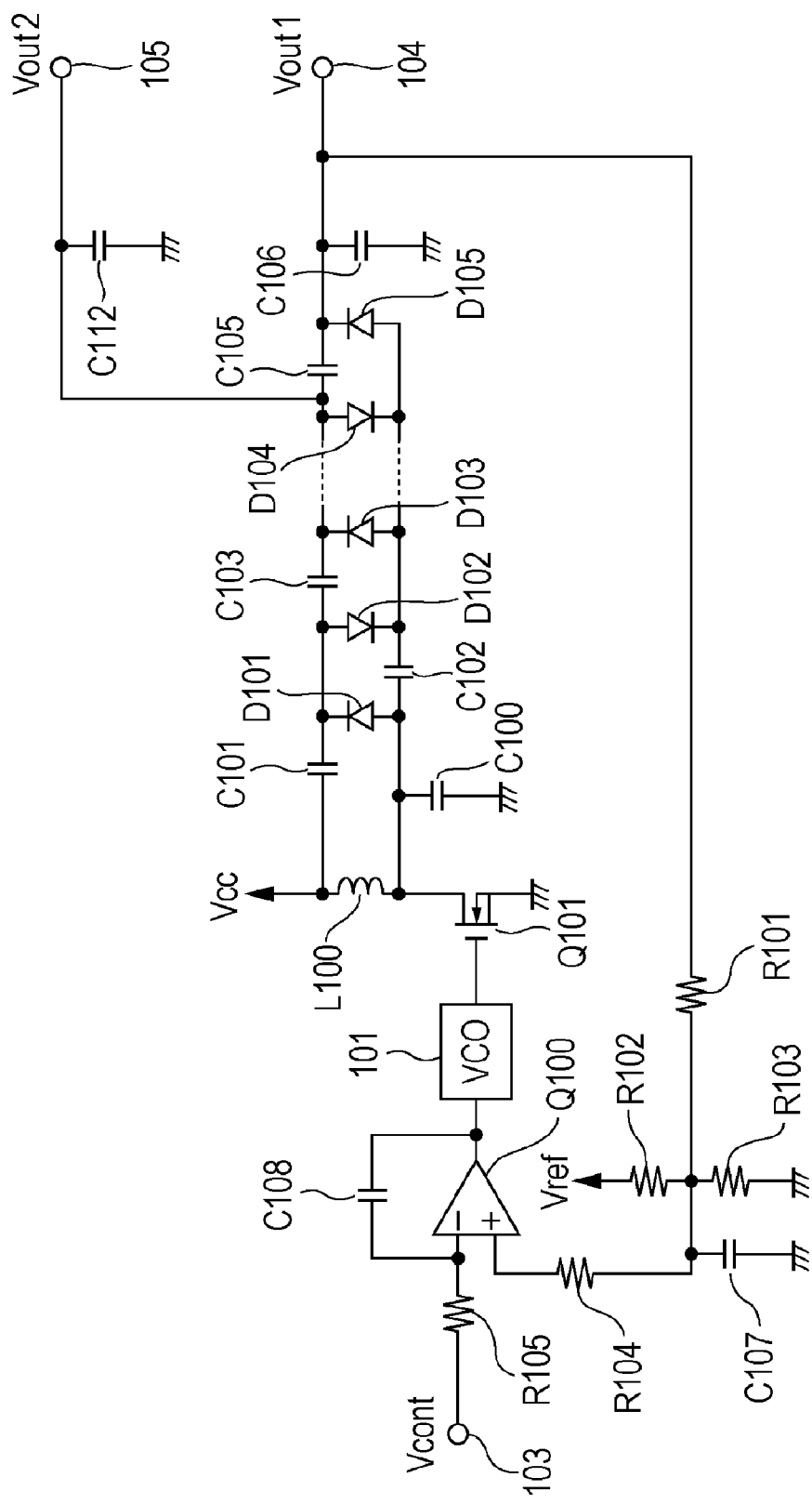
FIG. 13 is a circuit diagram of a power supply according to Embodiment 6.

In the circuit described in Embodiment 6 and illustrated in FIG. 13, as expressed by Eq. 2, the output voltage Vout2 can only get a value which is n times the maximum peak voltage Vmax of the flyback voltage. In this Embodiment 7 illustrated in FIG. 14, voltage divider resistor circuits are applied to make it possible to obtain arbitrary voltages other than n-fold voltages.

A circuit structure and operation of this Embodiment 7 will be described using FIG. 14. A voltage output which is n times the Vmax is obtained at the cathode side of the D105 of the circuit illustrated in FIG. 14. That is, when a rectifier circuit has a structure in which an output Vout1 is n×Vmax, the voltage at the anode side of the D104 is (n−1) times the Vmax. Then, an output Vout2 is a voltage obtained by dividing the voltage obtained at the anode side of the D104 by resistors R108 and R109. This Vout2 is R109/(R108 +R109)×(n−1)× Vmax. That is, in the circuit illustrated in FIG. 14, two arbitrary voltage outputs as expressed by the following equation can be obtained.

$$Vout2 = R109/(R108+R109) \times (n-1) \times Vmax \quad (Eq. 3)$$

Furthermore, a circuit for outputting an arbitrary voltage Vout2, which is not an integer multiple of Vmax, has a simple and inexpensive circuit structure including the R108, R109, and C112. Here, a case in which there are two channels for output voltages has been described in this Embodiment 7, but the number of channels for output voltages is not limited to two. The circuit structure may have three or more channels. In this case, each of many output voltages should be obtained from a corresponding one of rectifier stages.

As described above, according to this embodiment, an output voltage can be appropriately adjusted in accordance with a load change in a high voltage power supply that does not use a transformer, and a plurality of high voltage outputs can be obtained.

Embodiment 8

Next, Embodiment 8 will be described with reference to FIG. 15. Note that, the description about parts that are the same as circuits of the high voltage power supply according to Embodiment 1 will be omitted. Differences between this Embodiment 8 and the above-described Embodiment 7 will be described below.

Figure 14:
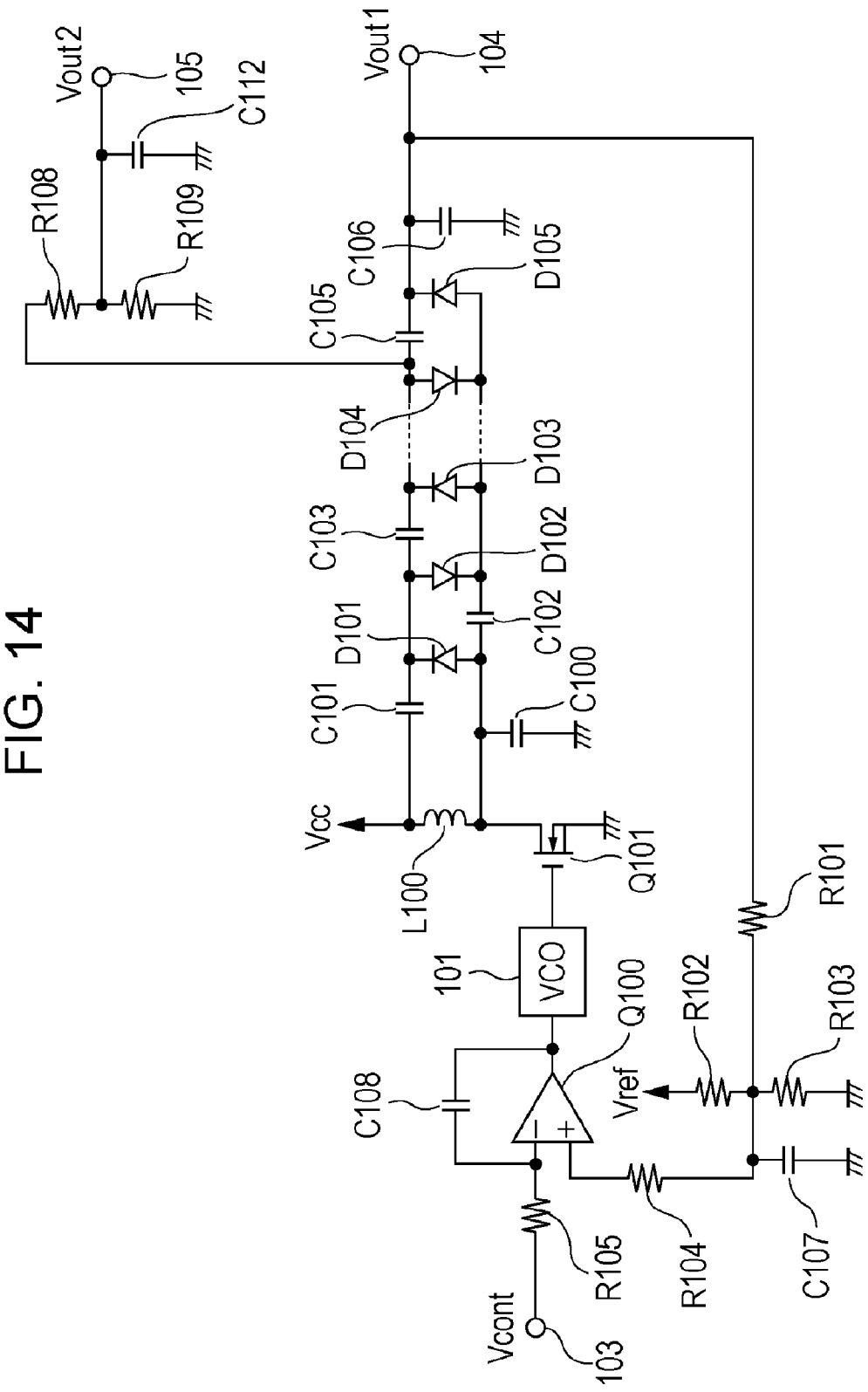
FIG. 14 is a circuit diagram of a power supply according to Embodiment 7.

In the circuit described in Embodiment 7 and illustrated in FIG. 14, as expressed by (Eq. 3), the output voltage Vout2 is an arbitrary voltage obtained as a result of resistor voltage division using the R108 and R109. This Embodiment 8 is characterized in that an arbitrary voltage is obtained by using a Zener diode D106 as a constant voltage element.

A circuit structure and operation will be described with reference to FIG. 15. A voltage output which is n times the Vmax is obtained at the cathode side of the D105 of the circuit illustrated in FIG. 15. That is, when a rectifier circuit has a structure in which a voltage output Vout1 is n×Vmax, the voltage at the anode side of the D104 is (n−1) times the Vmax. An output Vout2 is a value obtained by subtracting a Zener voltage Vz of the Zener diode D106 from the voltage obtained at the anode side of the D104, and thus the Vout2 is (n−1)× Vmax−Vz. That is, in the circuit illustrated in FIG. 15, two arbitrary voltage outputs can be obtained as expressed below.

$$Vout2 = (n-1) \times Vmax - Vz \quad (Eq. 4)$$

Furthermore, a circuit for outputting an arbitrary voltage Vout2, which is not an integer multiple of Vmax, has a simple and inexpensive circuit structure including the D106, C112, and R110.

Figure 15:
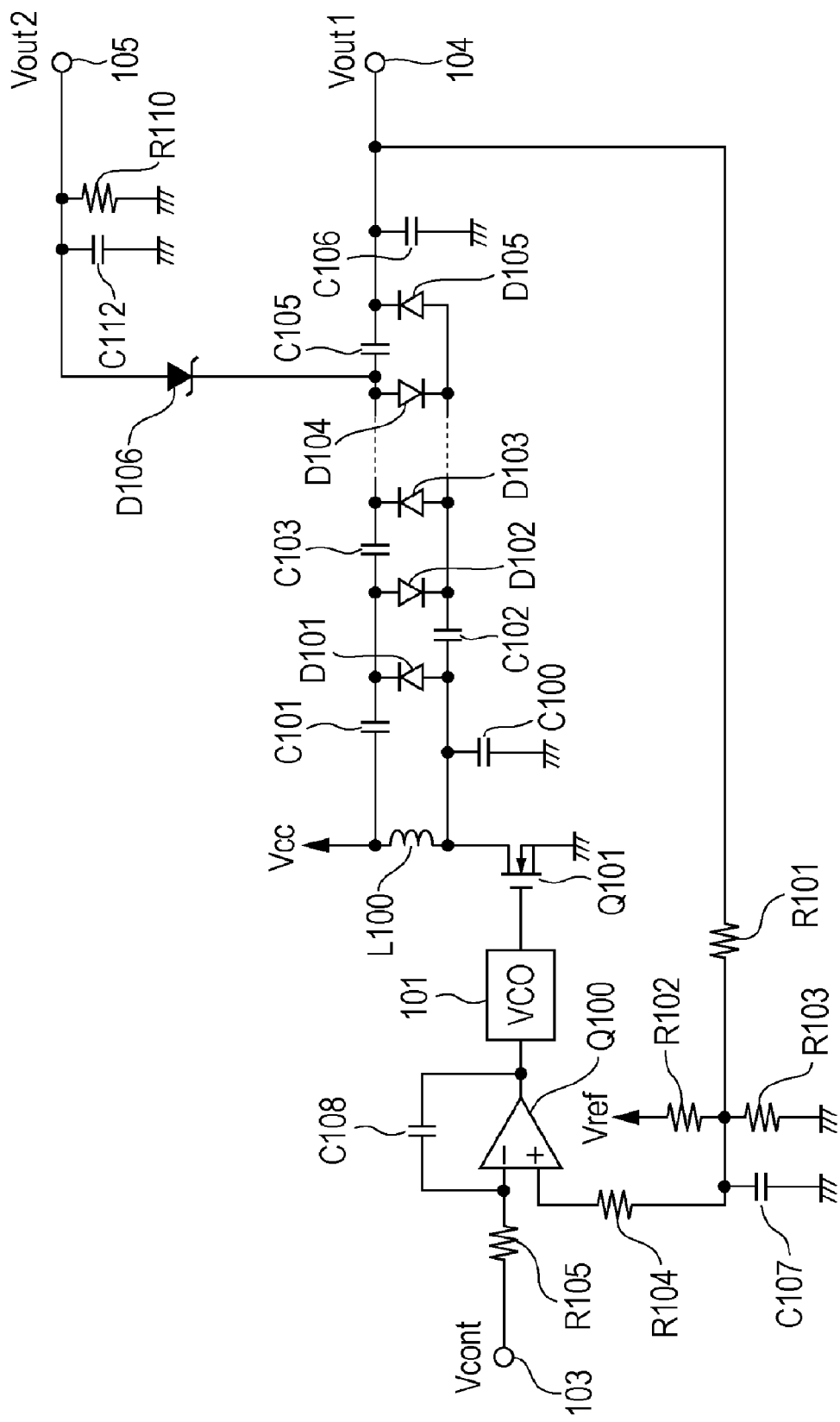
FIG. 15 is a circuit diagram of a power supply according to Embodiment 8.

Here, the R110 in FIG. 15 is used to guarantee the Zener voltage of the D106. If a connected load can guarantee the Zener voltage, the R110 can be omitted. Here, a case in which there are two channels for output voltages has been described in this Embodiment 8, but the number of channels for output voltages is not limited to two. The circuit structure may have three or more channels. In this case, each of many output voltages should be obtained from a corresponding one of rectifier stages. Moreover, a Zener diode is used as a constant voltage element in this Embodiment 8; however, a varistor may also be used.

As described above, according to this embodiment, an output voltage can be appropriately adjusted in accordance with a load change in a high voltage power supply that does not use a transformer, and a plurality of high voltage outputs can be obtained.

Embodiment 9

Figure 16:
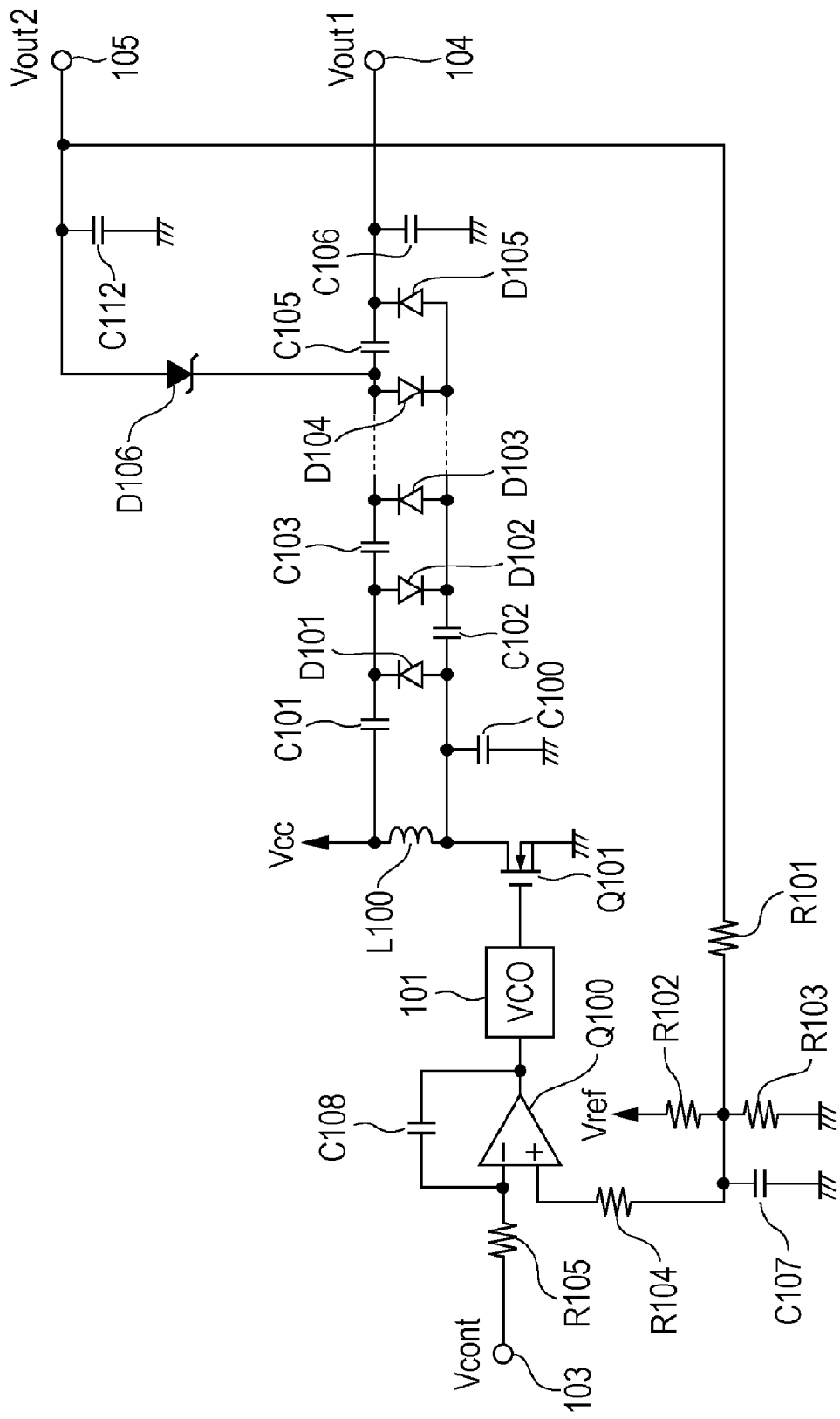
FIG. 16 is a circuit diagram of a power supply according to Embodiment 9.

Next, a power supply according to Embodiment 9 will be described with reference to FIG. 16. Note that, the description about parts that are the same as circuits of the high voltage power supply according to Embodiment 1 will be omitted. Differences between this Embodiment 9 and the above-described Embodiment 8 will be described below.

In the circuit described in Embodiment 8 and illustrated in FIG. 15, a feedback voltage to be fed back to the operational amplifier Q100 was obtained from the Vout1 to compensate output voltage fluctuations. However, this Embodiment 9 obtains the feedback voltage from the Vout2. With this structure, the withstand voltage of a part used in the feedback voltage channel can be lower. More specifically, the withstand voltage of the R101 can be lower and cost reduction can be realized.

Moreover, in the circuits illustrated in FIGS. 13 and 14, similarly to this Embodiment 9, cost reduction can be realized by obtaining the feedback voltage from the Vout2. Here, a case in which there are two channels for output voltages has been described in this Embodiment 9, but the number of channels for output voltages is not limited to two. The circuit structure may have three or more channels. In this case, each of many output voltages should be obtained from a corresponding one of rectifier stages.

As described above, according to this embodiment, an output voltage can be appropriately adjusted in accordance with a load change in a high voltage power supply that does not use a transformer, and a plurality of high voltage outputs can be obtained.

As described above, according to the present invention, an output voltage can be appropriately adjusted in accordance with a load change in a high voltage power supply that does not use a transformer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Reference Signs List
   100 VCO
   L100 inductor
   Q101 field-effect transistor
   C100, C101, C102, C103, C104, C105 capacitor
   D101, D102, D103, D104, D105 diode

What is claimed is:

1. A high voltage power supply, comprising:
   a signal generation unit configured to generate an output signal;
   a voltage generation unit configured to generate an input voltage according to the output signal generated by the signal generation unit;

a voltage amplifying unit configured to amplify the input voltage by rectifying and smoothing the input voltage a plurality of times; and a frequency control unit configured to control a frequency of the output signal generated by the signal generation unit according to a voltage amplified by the voltage amplifying unit.

2. The high voltage power supply according to claim 1, wherein the voltage generation unit includes a driving unit configured to drive a voltage resonance unit according to the output signal and the voltage resonant unit configured to generate a resonant voltage, being driven by the driving unit.

3. The high voltage power supply according to claim 2, wherein the driving unit is turned on or off according the output signal, and a voltage amplified by the voltage amplifying unit is changed by changing a period when the driving unit is on.

4. The high voltage power supply according to claim 1, further comprising:

a voltage supply unit configured to supply a voltage to the driving unit, wherein a voltage amplified by the voltage amplifying unit is changed by changing a voltage supplied by the voltage supply unit to the driving unit.

5. The high voltage power supply according to claim 1, wherein the voltage amplifying unit includes a first output unit configured to output a first voltage and a second output unit configured to output a voltage different from the first voltage.

6. An image forming apparatus, comprising:

an image forming member used for forming an image; and a high voltage power supply configured to output a high voltage to the image forming member, the high voltage power supply comprising:

a signal generation unit configured to generate an output signal, a voltage generation unit configured to generate an input voltage according to the output signal generated by the signal generation unit, a voltage amplifying unit configured to amplify the input voltage by rectifying and smoothing the input voltage a plurality of times, and a frequency control unit configured to control a frequency of the output signal generated by the signal generation unit according to a voltage amplified by the voltage amplifying unit.

7. The image forming apparatus according to claim 6, wherein the voltage generation unit includes a driving unit configured to drive a voltage resonance unit according to the output signal and the voltage resonant unit configured to generate a resonant voltage, being driven by the driving unit.

8. The image forming apparatus according to claim 7, wherein the driving unit is turned on or off according the output signal, and a voltage amplified by the voltage amplifying unit is changed by changing a period when the driving unit is on.

9. The image forming apparatus according to claim 7, further comprising:

a voltage supply unit configured to supply a voltage to the driving unit, wherein a voltage amplified by the voltage amplifying unit is changed by changing a voltage supplied by the voltage supply unit to the driving unit.

10. An image forming apparatus comprising:

an image bearing member on which an image is formed;

a transfer unit configured to transfer an image formed on the image bearing member; and a high voltage power supply configured to supply a high voltage to the transfer unit, the high voltage power supply comprising:

a signal generation unit configured to generate an output signal, a voltage generation unit configured to generate an input voltage according to the output signal generated by the signal generation unit, a voltage amplifying unit configured to amplify the input voltage by rectifying and smoothing the input voltage a plurality of times, and a frequency control unit configured to control a frequency of the output signal generated by the signal generation unit according to a voltage amplified by the voltage amplifying unit.

11. The image forming apparatus according to claim 10, wherein the voltage generation unit includes a driving unit configured to drive a voltage resonance unit according to the output signal and the voltage resonant unit configured to generate a resonant voltage, being driven by the driving unit.

12. The image forming apparatus according to claim 11, wherein the driving unit is turned on or off according the output signal, and a voltage amplified by the voltage amplifying unit is changed by changing a period when the driving unit is on.

13. The image forming apparatus according to claim 11, further comprising:

a voltage supply unit configured to supply a voltage to the driving unit, wherein a voltage amplified by the voltage amplifying unit is changed by changing a voltage supplied by the voltage supply unit to the driving unit.

* * * * *